(12) United States Patent
Ren et al.

(10) Patent No.: US 7,988,857 B2
(45) Date of Patent: Aug. 2, 2011

(54) METHOD FOR TREATING MIXED WASTEWATER FROM PHARMACEUTICAL CHEMICAL INDUSTRY PARK

(75) Inventors: Hongqiang Ren, Nanjing (CN); Lei Ge, Nanjing (CN); Feifei Wang, Nanjing (CN); Lili Ding, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 12/894,195

(22) Filed: Sep. 30, 2010

(65) Prior Publication Data

US 2011/0079554 A1 Apr. 7, 2011

Related U.S. Application Data

(63) Continuation of application No. PCT/CN2008/001373, filed on Jul. 25, 2008.

(30) Foreign Application Priority Data

Apr. 8, 2008 (CN) .......................... 2008 1 0023333

(51) Int. Cl.
*C02F 3/30* (2006.01)
*C02F 3/08* (2006.01)
(52) U.S. Cl. ......... 210/605; 210/615; 210/621; 210/631
(58) Field of Classification Search .................. 210/605, 210/615, 616, 617, 618, 621, 622, 623, 630, 210/631
See application file for complete search history.

(56) References Cited

U.S. PATENT DOCUMENTS

| | | | | |
|---|---|---|---|---|
| 5,057,221 A * | 10/1991 | Bryant et al. | ................. | 210/610 |
| 6,309,553 B1 * | 10/2001 | Lanting et al. | ................. | 210/802 |
| 6,692,642 B2 * | 2/2004 | Josse et al. | .................... | 210/605 |
| 6,716,351 B2 * | 4/2004 | Fassbender | ................... | 210/603 |
| 7,491,336 B2 * | 2/2009 | Markham et al. | ............. | 210/663 |
| 2008/0073268 A1 * | 3/2008 | Cort | .............................. | 210/609 |
| 2008/0099409 A1 * | 5/2008 | Gorelik et al. | ................ | 210/780 |
| 2009/0166296 A1 * | 7/2009 | Tigani et al. | ................... | 210/716 |
| 2009/0289007 A1 * | 11/2009 | Ren et al. | ..................... | 210/631 |

FOREIGN PATENT DOCUMENTS

JP 1-151998 A * 6/1989

* cited by examiner

*Primary Examiner* — Fred Prince
(74) *Attorney, Agent, or Firm* — Matthias Scholl P.C.; Matthias Scholl

(57) ABSTRACT

A method for treating mixed wastewater from pharmaceutical chemical industry parks including introducing mixed wastewater into a regulation tank for regulation of water flow and water quality, and then into a hydrolysis tank having a hanged filler and employing upflow water distribution, into an anaerobic tank employing upflow water distribution, into a moving bed biofilm reactor having a suspended filler and an aeration device at the bottom thereof, into a biological aerated filter including a ceramic filler, and finally treating using coagulating precipitation process. The final effluent has less than 100 mg/L COD.

12 Claims, No Drawings

METHOD FOR TREATING MIXED WASTEWATER FROM PHARMACEUTICAL CHEMICAL INDUSTRY PARK

CROSS-REFERENCE TO RELATED APPLICATIONS

This application is a continuation of International Patent Application No. PCT/CN2008/001373 with an international filing date of Jul. 25, 2008, designating the United States, now pending, and further claims priority benefits to Chinese Patent Application No. 200810023333.0 filed Apr. 08, 2008. The contents of all of the aforementioned applications, including any intervening amendments thereto, are incorporated herein by reference.

BACKGROUND OF THE INVENTION

1. Field of the Invention

The invention relates to a method for treating organic wastewater from industrial parks, and more particularly to a method for treating mixed wastewater from pharmaceutical chemical industry parks.

2. Description of the Related Art

Mixed wastewater from pharmaceutical chemical industry parks includes complex components, particularly a variety of organic matters. Thus, the mixed wastewater has unstable parameters, high COD and $BOD_5$ value, high concentration of $NH_3$—N and suspended solids, high toxicity, low COD/$BOD_5$ ratio, and deep color. Biochemical methods based on microorganisms is recognized as high efficiency for treating conventional wastewater, but for treating wastewater from pharmaceutical chemical industry parks, the disadvantages are obvious. Currently, the wastewater from pharmaceutical chemical industry parks is treated using hydrolysis plus biological contact oxidation. However, the method has a strict requirement on the components and pH value of the wastewater. Thus, it is not practicable for treating pharmaceutical wastewater.

Furthermore, the mixed wastewater from pharmaceutical chemical industry parks includes organic matters that are very difficult to degrade, how to make the organic matters degraded completely is a tough problem.

SUMMARY OF THE INVENTION

1. Technical problem

In view of the above-described problems, it is one objective of the invention to provide a method for treating mixed wastewater from pharmaceutical chemical industry parks with high speed and high efficiency.

2. Technical scheme

The principle of the invention is that, first, macromolecules of wastewater that are difficult to degrade using microorganisms are transformed into micromolecules using hydrolysis and acidification so as to improve the biodegradability of the wastewater, by which parts of COD are removed; second, a large quantity of organic matters are removed using anaerobic treatment; third, a large quantity of the organic matter residues are removed using aerobic treatment; and finally, the wastewater are treated using physical and chemical coagulation to remove the non-biodegradable matters.

To achieve the above objective, in accordance with one embodiment of the invention, there is provided a method for treating mixed wastewater from pharmaceutical chemical industry parks, comprising the steps of a) introducing mixed wastewater from pharmaceutical chemical industry parks into a regulation tank for regulation of water flow and water quality, and then into a hydrolysis tank which comprises a hanged filler and employs upflow water distribution;

b) introducing effluent from the hydrolysis tank into an anaerobic tank which employs upflow water distribution and comprises a perforated pipe as a water distribution pipe at the bottom thereof and a three-phase separation zone comprising a three-phase separator on the top thereof, a circulating reflux device being disposed under the three-phase separator and circulating effluent reentering the bottom of the anaerobic tank using an external circulating pressure pump;

c) introducing effluent from the anaerobic tank into a moving bed biofilm reactor (MBBR) comprising a suspended filler and an aeration device at the bottom thereof;

d) introducing effluent from the moving bed biofilm reactor into a biological aerated filter in the form of upper spraying, the biological aerated filter comprising a ceramic filler, at the bottom thereof being disposed with a support plate, a water outlet pipe, and a backwash water inlet pipe, on the top thereof being disposed with a sieve for preventing the overflow of the ceramic filler during backwashing and a backwash water outlet pipe, effluent therein being supernatant clear water; and e) introducing the effluent from the biological aerated filter into a sedimentation tank and a coagulation reaction tank in sequence for precipitation.

In the hydrolysis tank, macromolecules of wastewater that are difficult to degrade using microorganisms are transformed into micromolecules to improve the biodegradability of the wastewater. The wastewater from pharmaceutical chemical industry parks is mixed with an anaerobic digested sludge and thickened sludge and the resultant mixture is cultured in the hydrolysis tank and the anaerobic tank, respectively, for activating the sludge. The wastewater from pharmaceutical chemical industry parks is mixed with a returned activated sludge of a secondary sedimentation tank and the resultant mixture is cultured in the moving bed biofilm reactor and the biological aerated filter, respectively, without water in and out.

In a class of this embodiment, the anaerobic tank is a hybrid anaerobic reactor (HAR) combining the role of an upflow anaerobic sludge blanket (UASB) and the role of an anaerobic filter (AF). The wastewater flows through the reactor upwards and the sludge used therein doesn't need stiffing. The sludge is an anaerobic granular sludge or common activated sludge. The three-phase separator (gas, liquid, and solid) is disposed on the top of the reactor. The reactor comprises a water distribution zone at the bottom, a reaction zone in the middle, and a separation zone on the top. The external circulating reflux device of the reactor solves the problems of short circuiting and dead spots generally occurring in the UASB and strengthens the mixing and contact between anaerobic microorganisms and the wastewater, thereby improving the treatment load and efficiency. An initial volume load of the reactor is 0.1-0.5 kg $COD/(m^3 \cdot d)$. When 70% COD is removed and the reactor runs smoothly, reducing the hydraulic retention time (HRT) gradually or increasing the COD concentration of influent can increase the volume load. The maximum volume load can reach 10 kg $COD/(m^3 \cdot d)$.

In a class of this embodiment, the MBBR is a plug flow reactor comprising a gas distribution zone and a water distribution zone at the bottom, with a gas-water ratio of 50:1, a volume load of 2-2.5 kg $BOD_5/(m^3 \cdot d)$, a sludge concentration of 8 g/L, a filler filling ratio of 60% by volume, a volume of 600 L, and a hydraulic retention time of 30 h. A serrated overflow weir plate is disposed at a water outlet of the MBBR and the effluent is supernatant clear water. The wastewater flows through the suspended fillers in the MBBR continuously and is purified by microorganisms of a biofilm formed on the internal and external surface of the suspended fillers.

In a class of this embodiment, the precipitation process comprises a flocculant adding device, the coagulation reaction tank, and a final sedimentation tank. The flocculant is an aluminum salt, particularly a polyaluminum, for example, polyaluminium chloride (PAC), or a polymer flocculant. The precipitation process has no specific requirement on the flocculant. Thus, the flocculant may be aluminium iron silicate and a coagulant aid may be a polyacrylamide.

Advantages of the invention are summarized below. The method of the invention can treat wastewater from pharmaceutical chemical industry parks with high speed and high efficiency. The final effluent fulfills the latest pharmaceutical wastewater discharge standards, with a COD of less than 100 mg/L. The equipment employed in the invention occupies a small area and easy for maintenance.

DETAILED DESCRIPTION OF THE EMBODIMENTS

EXAMPLE 1

A mixed wastewater influent to be treated from pharmaceutical chemical industry parks comprised 1,000-1,500 mg/L COD, 300-400 mg/L $BOD_5$, 1,800 mg/L suspended solids, with pH value 7.0-8.0 and chroma 200 times.

(A) The mixed wastewater was first introduced into a regulation tank for regulation of water flow and water quality and then into a hydrolysis tank with a volume of 230 L. The seed sludge used therein was an anaerobic digested sludge and thickened sludge from urban sewage treatment plants, with a concentration of 3,000-5,000 mg/L. The tank comprised a hanged filler (PE+PVA wire) and employed upflow water distribution with a velocity of 1.0-1.6 m/h. The hydraulic retention time therein was 11.5 h.

(B) The treated wastewater from the hydrolysis tank was introduced into an anaerobic tank with a volume of 450 L and the upflow water velocity therein was 0.5-1.2 m/h. The seed sludge used therein was anaerobic digested sludge and thickened sludge from urban sewage treatment plants, with volatile suspended solids (VSS) of 60-68 g/L and suspended solids (SS) of 70-80 g/L. The hydraulic retention time therein was 22.5 h.

(C) The wastewater was further introduced into an aerobic moving bed biofilm reactor with a volume of 600 L. The seed sludge used therein was a returned activated sludge of a secondary sedimentation tank from urban sewage treatment plants. The aerobic moving bed biofilm reactor comprised a hollow cross brace suspended filler (high-density polypropylene) (1*1), with a filling ratio of 60% by volume. The gas-water ratio therein was 50:1 and the hydraulic retention time therein was 30 h.

(D) The wastewater was further introduced into a biological aerated filter with a volume of 300 L. The seed sludge used therein was a returned activated sludge of a secondary sedimentation tank from urban sewage treatment plants. The biological aerated filter comprised a round ceramic filler. The temperature therein was between 10 and 35° C. The gas-water ratio therein was 20:1 and the hydraulic retention time therein was 15 h.

(E) The wastewater was further treated using flocculating process during which 600 mg/L PAC was added as a flocculant.

The final effluent comprised 80 mg/L COD, 15 mg/L $BOD_5$, 10 g/L suspended solids, with pH value 7 and chroma 16 times.

EXAMPLE 2

A mixed wastewater influent to be treated from pharmaceutical chemical industry parks comprised 1,500-2,000 mg/L COD, 350-600 mg/L $BOD_5$, 2,100 mg/L suspended solids, with pH value 8.0-9.0 and chroma 250 times.

(A) The mixed wastewater was first introduced into a regulation tank for regulation of water flow and water quality and then into a hydrolysis tank with a volume of 230 L. The seed sludge used therein was an anaerobic digested sludge and thickened sludge from urban sewage treatment plants, with a concentration of 3,000-5,000 mg/L. The tank comprised a hanged filler (PE+PVA wire) and employed upflow water distribution with a velocity of 1.0-1.6 m/h. The hydraulic retention time therein was 13 h.

(B) The treated wastewater from the hydrolysis tank was introduced into an anaerobic tank with a volume of 450 L and the upflow water velocity therein was 0.5-1.2 m/h. The seed sludge used therein was anaerobic digested sludge and thickened sludge from urban sewage treatment plants, with volatile suspended solids (VSS) of 60-68 g/L and suspended solids (SS) of 70-80 g/L. The hydraulic retention time therein was 25.5 h.

(C) The wastewater was further introduced into an aerobic moving bed biofilm reactor with a volume of 600 L. The seed sludge used therein was a returned activated sludge of a secondary sedimentation tank from urban sewage treatment plants. The aerobic moving bed biofilm reactor comprised a hollow cross brace suspended filler (high-density polypropylene) (1*1), with a filling ratio of 60% by volume. The gas-water ratio therein was 50:1 and the hydraulic retention time therein was 34 h.

(D) The wastewater was further introduced into a biological aerated filter with a volume of 300 L. The seed sludge used therein was a returned activated sludge of a secondary sedimentation tank from urban sewage treatment plants. The biological aerated filter comprised a round ceramic filler. The temperature therein was between 10 and 35° C. The gas-water ratio therein was 20:1 and the hydraulic retention time therein was 17 h.

(E) The wastewater was further treated using flocculating process during which 600 mg/L PAC was added as a flocculant.

The final effluent comprised 90 mg/L COD, 18 mg/L $BOD_5$, 11 mg/L suspended solids, with pH value 7.5 and chroma 20 times.

EXAMPLE 3

A mixed wastewater influent to be treated from pharmaceutical chemical industry parks comprised 1,000-3,000 mg/L COD, 300-7,500 mg/L $BOD_5$, 2,500 mg/L suspended solids, with pH value 6.0-8.0 and chroma 220 times.

(A) The mixed wastewater was first introduced into a regulation tank for regulation of water flow and water quality and then into a hydrolysis tank with a volume of 230 L. The seed sludge used therein was an anaerobic digested sludge and thickened sludge from urban sewage treatment plants, with a concentration of 3,000-5,000 mg/L. The tank comprised a hanged filler (PE+PVA wire) and employed upflow water distribution with a velocity of 1.0-1.6 m/h. The hydraulic retention time therein was 15 h.

(B) The treated wastewater from the hydrolysis tank was introduced into an anaerobic tank with a volume of 450 L and the upflow water velocity therein was 0.5-1.2 m/h. The seed sludge used therein was anaerobic digested sludge and thickened sludge from urban sewage treatment plants, with volatile suspended solids (VSS) of 60-68 g/L and suspended solids (SS) of 70-80 g/L. The hydraulic retention time therein was 30 h.

(C) The wastewater was further introduced into an aerobic moving bed biofilm reactor with a volume of 600 L. The seed sludge used therein was a returned activated sludge of a secondary sedimentation tank from urban sewage treatment plants. The aerobic moving bed biofilm reactor comprised a hollow cross brace suspended filler (high-density polypropylene) (1*1), with a filling ratio of 60% by volume. The gas-water ratio therein was 50:1 and the hydraulic retention time therein was 40 h.

(D) The wastewater was further introduced into a biological aerated filter with a volume of 300 L. The seed sludge used therein was a returned activated sludge of a secondary sedimentation tank from urban sewage treatment plants. The biological aerated filter comprised a round ceramic filler. The temperature therein was between 10 and 35° C. The gas-water ratio therein was 20:1 and the hydraulic retention time therein was 20 h.

(E) The wastewater was further treated using flocculating process during which 650 mg/L PAC was added as a flocculant.

The final effluent comprised 85 mg/L COD, 20 mg/L $BOD_5$, 8 mg/L suspended solids, with pH value 7.5 and chroma 16 times.

EXAMPLE 4

A mixed wastewater influent to be treated from pharmaceutical chemical industry parks comprised 1,000-2,000 mg/L COD, 300-600 mg/L $BOD_5$, 1,500 mg/L suspended solids, with pH value 9.0-10.0 and chroma 160 times.

(A) The mixed wastewater was first introduced into a regulation tank for regulation of water flow and water quality and then into a hydrolysis tank with a volume of 230 L. The seed sludge used therein was an anaerobic digested sludge and thickened sludge from urban sewage treatment plants, with a concentration of 3,000-5,000 mg/L. The tank comprised a hanged filler (PE+PVA wire) and employed upflow water distribution with a velocity of 1.0-1.6 m/h. The hydraulic retention time therein was 11.5 h.

(B) The treated wastewater from the hydrolysis tank was introduced into an anaerobic tank with a volume of 450 L and the upflow water velocity therein was 0.5-1.2 m/h. The seed sludge used therein was anaerobic digested sludge and thickened sludge from urban sewage treatment plants, with volatile suspended solids (VSS) of 60-68 g/L and suspended solids (SS) of 70-80 g/L. The hydraulic retention time therein was 22.5 h.

(C) The wastewater was further introduced into an aerobic moving bed biofilm reactor with a volume of 600 L. The seed sludge used therein was a returned activated sludge of a secondary sedimentation tank from urban sewage treatment plants. The aerobic moving bed biofilm reactor comprised a hollow cross brace suspended filler (high-density polypropylene) (1*1), with a filling ratio of 60% by volume. The gas-water ratio therein was 50:1 and the hydraulic retention time therein was 30 h.

(D) The wastewater was further introduced into a biological aerated filter with a volume of 300 L. The seed sludge used therein was a returned activated sludge of a secondary sedimentation tank from urban sewage treatment plants. The biological aerated filter comprised a round ceramic filler. The temperature therein was between 10 and 35° C. The gas-water ratio therein was 20:1 and the hydraulic retention time therein was 15 h.

(E) The wastewater was further treated using flocculating process during which 550 mg/L PAC was added as a flocculant.

The final effluent comprised 75 mg/L COD, 12 mg/L $BOD_5$, 10 mg/L suspended solids, with pH value 7.8 and chroma 16 times.

EXAMPLE 5

A mixed wastewater influent to be treated from pharmaceutical chemical industry parks comprised 2,000-3,000 mg/L COD, 350-550 mg/L $BOD_5$, 900 mg/L suspended solids, with pH value 6.0-7.5 and chroma 150 times.

(A) The mixed wastewater was first introduced into a regulation tank for regulation of water flow and water quality and then into a hydrolysis tank with a volume of 230 L. The seed sludge used therein was an anaerobic digested sludge and thickened sludge from urban sewage treatment plants, with a concentration of 3,000-5,000 mg/L. The tank comprised a hanged filler (PE+PVA wire) and employed upflow water distribution with a velocity of 1.0-1.6 m/h. The hydraulic retention time therein was 15 h.

(B) The treated wastewater from the hydrolysis tank was introduced into an anaerobic tank with a volume of 450 L and the upflow water velocity therein was 0.5-1.2 m/h. The seed sludge used therein was anaerobic digested sludge and thickened sludge from urban sewage treatment plants, with volatile suspended solids (VSS) of 60-68 g/L and suspended solids (SS) of 70-80 g/L. The hydraulic retention time therein was 30 h.

(C) The wastewater was further introduced into an aerobic moving bed biofilm reactor with a volume of 600 L. The seed sludge used therein was a returned activated sludge of a secondary sedimentation tank from urban sewage treatment plants. The aerobic moving bed biofilm reactor comprised a hollow cross brace suspended filler (high-density polypropylene) (1*1), with a filling ratio of 60% by volume. The gas-water ratio therein was 50:1 and the hydraulic retention time therein was 40 h.

(D) The wastewater was further introduced into a biological aerated filter with a volume of 300 L. The seed sludge used therein was a returned activated sludge of a secondary sedimentation tank from urban sewage treatment plants. The biological aerated filter comprised a round ceramic filler. The temperature therein was between 10 and 35° C. The gas-water ratio therein was 20:1 and the hydraulic retention time therein was 20 h.

(E) The wastewater was further treated using flocculating process during which 700 mg/L PAC was added as a flocculant.

The final effluent comprised 90 mg/L COD, 15 mg/L $BOD_5$, 5 mg/L suspended solids, with pH value 7 and chroma 8 times.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for treating mixed wastewater from pharmaceutical chemical industry parks, comprising the steps of
   a) introducing mixed wastewater from pharmaceutical chemical industry parks into a regulation tank for regulation of water flow and water quality, and then into a hydrolysis tank which comprises a hanged filler and employs upflow water distribution;
   b) introducing effluent from said hydrolysis tank into an anaerobic tank which employs upflow water distribution and comprises a perforated pipe as a water distribution pipe at the bottom thereof and a three-phase separation zone comprising a three-phase separator on the top thereof, a circulating reflux device being disposed under said three-phase separator and circulating effluent reentering the bottom of said anaerobic tank using an external circulating pressure pump;
   c) introducing effluent from said anaerobic tank into a moving bed biofilm reactor (MBBR) comprising a suspended filler and an aeration device at the bottom thereof;
   d) introducing effluent from said moving bed biofilm reactor into a biological aerated filter in the form of upper spraying, said biological aerated filter comprising a ceramic filler, at the bottom thereof being disposed with a support plate, a water outlet pipe, and a backwash water inlet pipe, on the top thereof being disposed with a sieve for preventing the overflow of said ceramic filler during backwashing and a backwash water outlet pipe, effluent therein being supernatant clear water; and
   e) introducing said effluent from said biological aerated filter into a sedimentation tank and a coagulation reaction tank in sequence for precipitation.

2. The method of claim 1, wherein said wastewater from pharmaceutical chemical industry parks is mixed with an anaerobic digested sludge and thickened sludge and the resultant mixture is cultured in said hydrolysis tank and said anaerobic tank, respectively, for activating the sludge; said wastewater from pharmaceutical chemical industry parks is mixed with a returned activated sludge of a secondary sedimentation tank and the resultant mixture is cultured in said moving bed biofilm reactor and said biological aerated filter, respectively, without water in and out.

3. The method of claim 2, wherein said wastewater is introduced continuously so that said sludge in said hydrolysis tank and in said anaerobic tank is activated and microorganisms in said hydrolysis tank, in said moving bed biofilm reactor, and in said biological aerated filter are cultured; and operating parameters of said tank/reactor/filter are adjusted as needed to optimize the running thereof.

4. The method of claim 3, wherein said anaerobic tank is a hybrid anaerobic reactor combining the role of an upflow anaerobic sludge blanket and the role of an anaerobic filter.

5. The method of claim 3, wherein said moving bed biofilm reactor is a plug flow reactor comprising a gas distribution zone at the bottom thereof, with a gas-water ratio of 50:1, a filler filling ratio of 60% by volume, and a serrated overflow weir plate is disposed at a water outlet thereof.

6. The method of claim 3, wherein as a flocculant an aluminum salt is added to said coagulation reaction tank.

7. The method of claim 2, wherein said anaerobic tank is a hybrid anaerobic reactor combining the role of an upflow anaerobic sludge blanket and the role of an anaerobic filter.

8. The method of claim 2, wherein said moving bed biofilm reactor is a plug flow reactor comprising a gas distribution zone at the bottom thereof, with a gas-water ratio of 50:1, a filler filling ratio of 60% by volume, and a serrated overflow weir plate is disposed at a water outlet thereof.

9. The method of claim 2, wherein as a flocculant an aluminum salt is added to said coagulation reaction tank.

10. The method of claim 1, wherein said anaerobic tank is a hybrid anaerobic reactor combining the role of an upflow anaerobic sludge blanket and the role of an anaerobic filter.

11. The method of claim 1, wherein said moving bed biofilm reactor is a plug flow reactor comprising a gas distribution zone at the bottom thereof, with a gas-water ratio of 50:1, a filler filling ratio of 60% by volume, and a serrated overflow weir plate is disposed at a water outlet thereof.

12. The method of claim 1, wherein as a flocculant an aluminum salt is added to said coagulation reaction tank.

* * * * *